No. 803,342. PATENTED OCT. 31, 1905.
G. HOWARD & G. GIBBS.
VALVE GEAR FOR STEAM AND OTHER FLUID PRESSURE ENGINES.
APPLICATION FILED MAY 9, 1904.
3 SHEETS—SHEET 1.
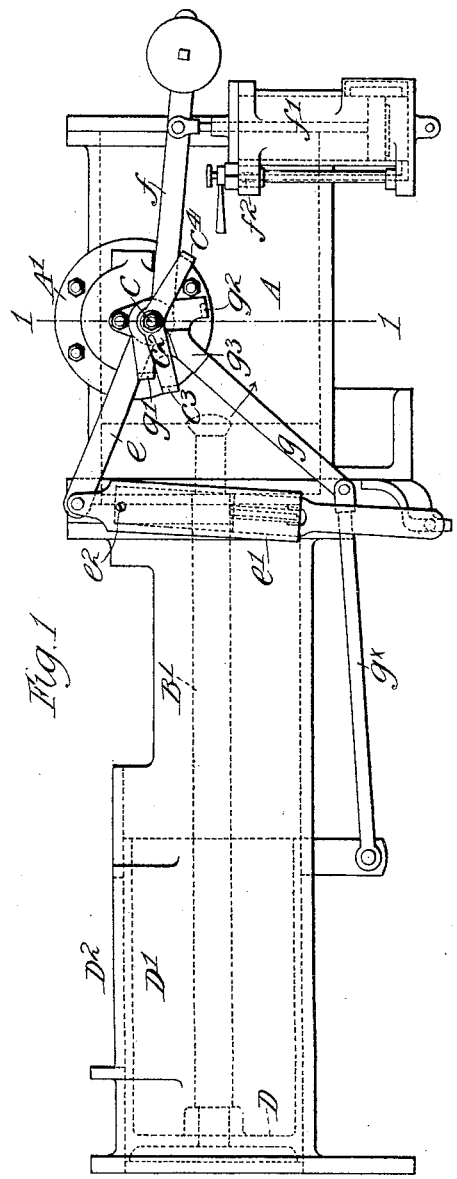
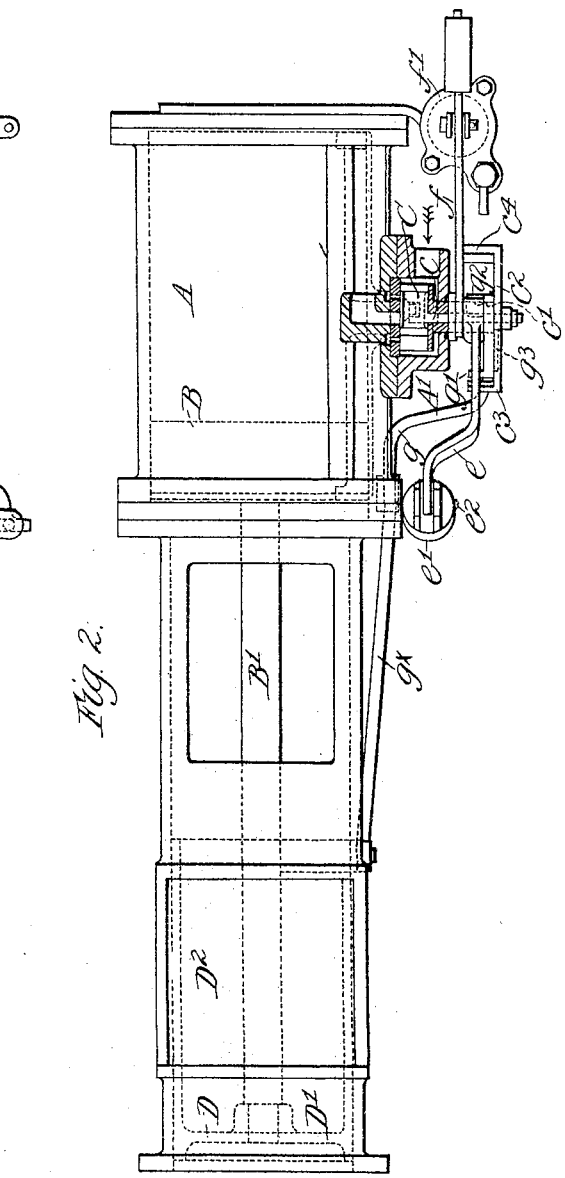
Witnesses:
Inventors
Geoffrey Howard
George Gibbs No. 803,342. PATENTED OCT. 31, 1905.
G. HOWARD & G. GIBBS.
VALVE GEAR FOR STEAM AND OTHER FLUID PRESSURE ENGINES.
APPLICATION FILED MAY 9, 1904.
3 SHEETS—SHEET 2.
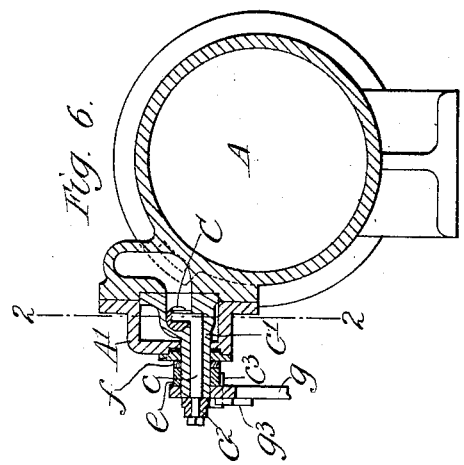
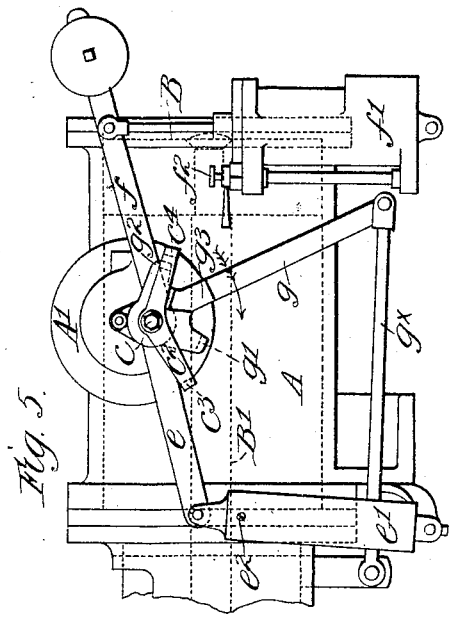
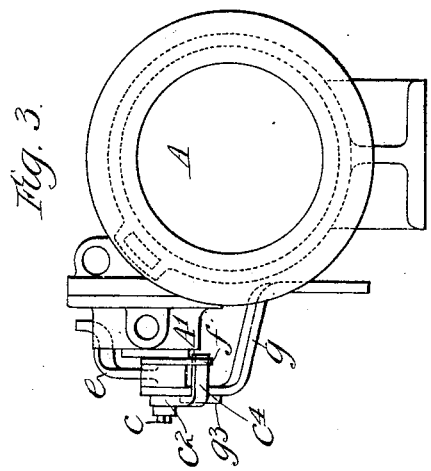
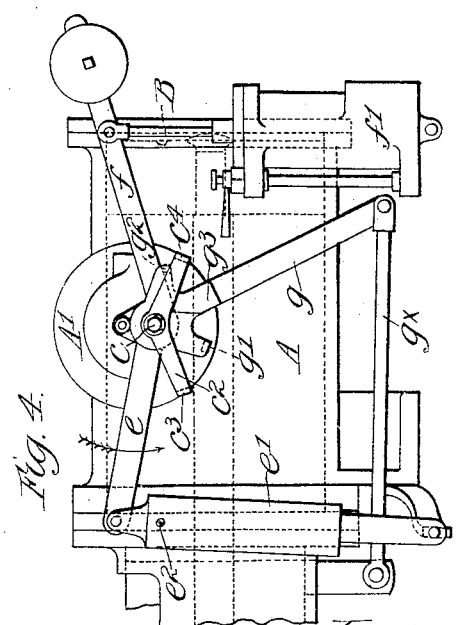
Witnesses:
Inventors
Geoffrey Howard
George Gibbs
By James L. Norris
Atty No. 803,342. PATENTED OCT. 31, 1905.
G. HOWARD & G. GIBBS.
VALVE GEAR FOR STEAM AND OTHER FLUID PRESSURE ENGINES.
APPLICATION FILED MAY 9, 1904.
3 SHEETS—SHEET 3.
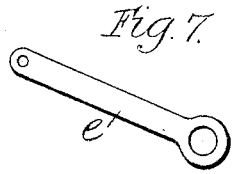
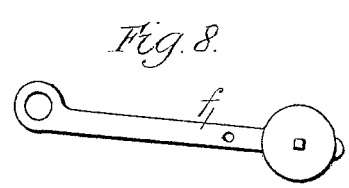
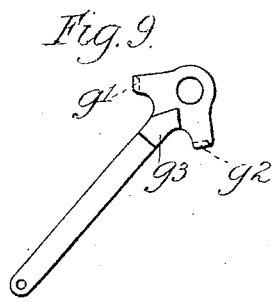
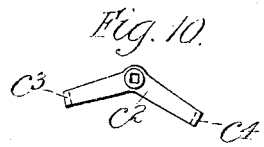
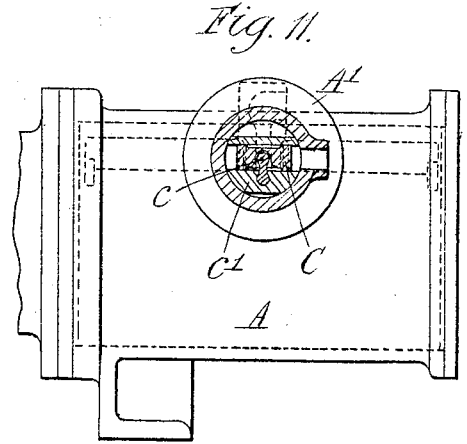

UNITED STATES PATENT OFFICE.

GEOFFREY HOWARD AND GEORGE GIBBS, OF BEDFORD, ENGLAND.

VALVE-GEAR FOR STEAM AND OTHER FLUID-PRESSURE ENGINES.

No. 803,342.        Specification of Letters Patent.        Patented Oct. 31, 1905.

Application filed May 9, 1904. Serial No. 207,172.

*To all whom it may concern:*

Be it known that we, GEOFFREY HOWARD and GEORGE GIBBS, engineers, subjects of the King of Great Britain, residing at Britannia Iron Works, Bedford, in the county of Bedford, England, have invented certain new and useful Improvements Relating to Valve-Gear for Steam and other Fluid-Pressure Engines, of which the following is a specification.

This invention has reference to valve-gear for steam and other fluid-pressure engines, and is particularly applicable to the control of the steam-distributing valve of a mechanical stoker of the kind in which there is a reciprocating ram or pusher for introducing the fuel into the furnace, the said ram operating by steam or other fluid under pressure admitted to and exhausted from the working cylinder by the distributing-valve, which is automatically actuated at periodical intervals that can be prolonged or diminished, as required, by adjusting the valve-gear.

It is the chief object of our present invention to so construct the valve-gear that it will not be appreciably affected by the changes in the position of the mechanical stoker or other fluid-pressure engine that arises from the rolling and pitching of a ship, the said valve-gear being thus rendered applicable equally well to mechanical stokers or other fluid-pressure engines, whether they be used for marine or land purposes.

Another object of our invention is to utilize with the said valve-gear two adjustable dash-pots or similar contrivances, which by reason of their adjustability render it possible to vary the duration of the pauses at the end of each stroke of the piston. We are thus able to control the number of fuel charges fed to the furnace in a given time and also to obtain the necessary amount of time for the fuel to descend from the hopper in front of the ram-piston for completely filling the space in front of the ram before an ensuing feed-stroke recurs. The said gear also enables the ram to remain in its forward position after performing the feed-stroke and to thus avoid the fire from the furnace from finding its way back into the feed-hopper, as is necessary in mechanical stokers of the kind referred to.

In order that our said invention may be clearly understood and readily carried into effect, we will describe the same with references to the accompanying drawings, in which—

Figure 1 is a side elevation of the valve-gear applied to a mechanical stoker of the kind hereinbefore mentioned. The parts are in this figure represented in the position they occupy when the distributing-valve is admitting motive fluid to the front end of the cylinder to cause the piston and ram to perform a backward stroke. Fig. 2 is a plan, and Fig. 3 an end elevation, of the said valve-gear. Fig. 4 is a side elevation similar to Fig. 1, but with the parts in the position they assume when the said distributing-valve occupies the position for cutting off the motive fluid and the piston and ram have completed their rearward stroke. Fig. 5 is a similar view, but with the parts in the position they assume when the distributing-valve occupies the position for admitting the motive fluid to the back end of the cylinder for causing the piston and ram to perform their forward stroke. Fig. 6 is a cross-section taken approximately on the line 1 1 of Fig. 1. Figs. 7, 8, 9, and 10 are elevations showing separately some of the parts used for actuating and controlling the distributing-valve. Fig. 11 is a longitudinal sectional elevation taken approximately on the line 2 2 of Fig. 6.

In all the figures like letters of reference indicate similar parts.

A is the steam or other fluid-pressure cylinder.

B is the piston.

C is the distributing-valve.

D is the ram or pusher, which is connected with the piston by the rod B'. D' is the chamber in which said ram or pusher works. The fuel is supplied to said chamber through an opening $D^2$ from a hopper situated above the opening, said fuel being thrust forward into the furnace by the advance of the pusher, as is well understood in this class of apparatus. The said distributing-valve is in the example illustrated of the reciprocating piston type actuated by a finger carried by a spindle $c$, that extends through a bearing or sleeve $c'$, forming part of the steam-chest A'.

The spindle $c$ of the distributing-valve C is surrounded by a sleeve or boss $c'$, which extends through the steam-chest A' and carries a pair of loose and independent arms $e\,f$ and a loose oscillatory lever $g$. The arms $e$ and $f$ are connected at or near their outer ends with dash-pots $e'$ and $f'$, respectively, and the lever $g$ is connected, by means of a rod $g^\times$, with the ram or pusher D. Fixed to the outer end of the valve-spindle $c$ is a cross-piece $c^2$, which is capable of being actuated by any one of the said three arms or levers $e$ $f$ $g$, for which purpose the said cross-piece has a flange $c^3$ projecting in the path of the arm $e$ and a flange $c^4$ projecting in the path of the arm $f$. The said lever $g$ also has projections $g'$ $g^2$, which are adapted to actuate the said arms $e$ and $f$. It also has a projection $g^3$, that actuates the cross-piece $c^2$.

When fluid under pressure is admitted, say, to the front end of the cylinder A by the valve C, which then occupies the position represented in Fig. 1, the piston B moves backward and retracts the ram D, at the same time angularly shifting the lever $g$ in a backward direction. As this lever $g$ continues its backward movement its projection $g^2$ engages with the arm $f$, and thus raises the latter. At the same time the projection $g'$ of said lever $g$ leaves the arm $e$ and permits it to descend by the action of gravity at a speed which is controlled by the dash-pot $e'$. By the time the piston reaches the rearward end of its stroke the projection $g^3$ of the lever $g$ has turned the cross-piece $c^2$, and therefore the valve C, into the position to cut off the supply of the motive fluid to the cylinder. (See Fig. 4.) The piston and its ram then remain in this position at the rearward end of their stroke, while the arm $e$ descends by the action of gravity and under the control of its dash-pot $e'$. As the said arm completes its descent it strikes the flange $c^3$ of the cross-piece $c^2$ and turns the latter into a position to cause the valve C to admit the motive fluid to the back end of the cylinder. (See Fig. 5.) The piston and ram then perform their forward stroke and at the same time move the lever $g$ angularly into its forward position, Fig. 1, which operation causes said lever to again raise the arm $e$ by means of its projection $g'$ and to turn the cross-piece $c^2$ into a position to bring the valve C into its "shut-off" position. During this movement the arm $f$ is liberated by the projection $g^2$, so that it descends by the action of gravity at a certain speed, which is under the control of its dash-pot $f'$. In completing its descent the said arm $f$ actuates the cross-piece $c^2$ through the flange $c^4$, and thereby sets the valve C into the position for again admitting the motive fluid to the front of the cylinder and again retracting the piston and ram. A fresh cycle of operations similar to that already described is then performed, whereby the apparatus continues working and automatically supplies the fuel to the furnace. The said dash-pots $e'$ and $f'$ have valves $e^2$ $f^2$ for regulating the speed at which the arms $e$ and $f$ can descend, so that the duration of time that elapses at each pause between the strokes of the piston and ram can be regulated at will for the purposes hereinbefore stated. The dash-pot $e'$ is somewhat analogous to a "door-check" and works with atmospheric air. The dash-pot $f'$ works with liquid, such as oil.

Although our invention is especially intended for use with mechanical stokers having a fluid-pressure working cylinder, it may obviously be applied to fluid-pressure engines used for other purposes than mechanical stoking.

What we claim, and desire to secure by Letters Patent of the United States, is—

1. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, and an oscillatory lever adapted to alternately elevate and retain said arms in an elevated position and alternately actuate the cross-piece in opposite directions in advance of its actuation by said arms, thereby closing the valve and temporarily shutting off the supply of motive fluid until the cross-piece is actuated by one of said arms.

2. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, an oscillatory lever adapted to alternately elevate and retain said arms in an elevated position and alternately actuate the cross-piece in opposite directions in advance of its actuation by said arms, thereby closing the valve and temporarily shutting off the supply of motive fluid until the cross-piece is actuated by one of said arms, and means for retarding the downward movement of said arms.

3. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, an oscillatory lever adapted to alternately elevate and retain said arms in an elevated position and alternately actuate the cross-piece in opposite directions in advance of its actuation by said arms, thereby closing the valve and temporarily shutting off the supply of motive fluid until the cross-piece is actuated by one of said arms, and a dash-pot connected to each of the said arms for retarding the downward movement thereof.

4. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, and an oscillatory lever having its upper end provided with a pair of outwardly-extending projections and an intermediate projection, said outwardly-extending projections adapted to alternately elevate and retain said arms in an elevated position and said intermediate projection adapted to alternately actuate the cross-piece in opposite directions in advance of its actuation by said arms, thereby closing the valve and temporarily shutting off the supply of motive fluid until the cross-piece is actuated by the downward movement of one of said arms.

5. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, an oscillatory lever having its upper end provided with a pair of outwardly-extending projections and an intermediate projection, said outwardly-extending projections adapted to alternately elevate and retain said arms in an elevated position and said intermediate projection adapted to alternately actuate the cross-piece in opposite directions in advance of its actuation by said arms, thereby closing the valve and temporarily shutting off the supply of motive fluid until the cross-piece is actuated by the downward movement of one of said arms, and means for retarding the downward movement of said arms.

6. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, an oscillatory lever having its upper end provided with a pair of outwardly-extending projections and an intermediate projection, said outwardly-extending projections adapted to alternately elevate and retain said arms in an elevated position and said intermediate projection adapted to alternately actuate the cross-piece in opposite directions in advance of its actuation by said arms, thereby closing the valve and temporarily shutting off the supply of motive fluid until the cross-piece is actuated by the downward movement of one of said arms, and a dash-pot connected with each of said arms.

7. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, an oscillatory lever adapted to alternately elevate and retain said arms in an elevated position and alternately actuate the cross-piece in opposite directions in advance of its actuation by said arms, thereby closing the valve and temporarily shutting off the supply of motive fluid until the cross-piece is actuated by one of said arms, a dash-pot connected to each of the said arms for retarding the downward movement thereof, and means for regulating the degree of the retardation of each of the dash-pots.

8. In valve-gear and other fluid-pressure engines, means for temporarily arresting the movement of the piston at each end of its stroke, said means comprising the combination with the distributing-valve, of a cross-piece connected therewith for opening and closing it, a pair of gravity-movable arms adapted to alternately engage said cross-piece for opening the valve, an oscillatory lever having its upper end provided with a pair of outwardly-extending projections and an intermediate projection, said outwardly-extending projections adapted to alternately elevate and retain said arms in an elevated position and said intermediate projection adapted to alternately actuate the cross-piece in opposite directions in advance of its actuation by said arms, thereby closing the valve and temporarily shutting off the supply of motive fluid until the cross-piece is actuated by the downward movement of one of said arms, a dash-pot connected with each of said arms, and means for regulating the degree of the rotation of each of the dash-pots.

9. In valve-gear and other fluid-pressure engines, means for temporarily arresting the movement of the piston at each end of its stroke, said means comprising the combination with the distributing-valve, of a cross-piece connected therewith for opening and closing it and provided with a pair of flanges, a pair of gravity-movable arms adapted to alternately engage the flanges of the cross-piece for actuating the latter, thereby opening the valve, and an oscillatory lever having its upper end provided with a pair of outwardly-extending projections and an intermediate projection, said outwardly-extending projections adapted to alternately elevate and retain said arms in an elevated position and said intermediate projection adapted to actuate the cross-piece in opposite directions in advance of its actuation by said arms, thereby closing the valve and temporarily shutting off the supply of motive fluid until the cross-piece is actuated by the downward movement of one of said arms.

10. In valve-gear and other fluid-pressure engines, means for temporarily arresting the movement of the piston at each end of its stroke, said means comprising the combination with the distributing-valve, of a cross-piece connected therewith for opening and closing it and provided with a pair of flanges, a pair of gravity-movable arms adapted to alternately engage the flanges of the cross-piece for actuating the latter, thereby opening the valve, an oscillatory lever having its upper end provided with a pair of outwardly-extending projections and an intermediate projection, said outwardly-extending projections adapted to alternately elevate and retain said arms in an elevated position and said intermediate projection adapted to actuate the cross-piece in opposite directions in advance of its actuation by said arms, thereby closing the valve and temporarily shutting off the supply of motive fluid until the cross-piece is actuated by the downward movement of one of said arms, and means for retarding the downward movement of the said arms.

11. In valve-gear and other fluid-pressure engines, means for temporarily arresting the movement of the piston at each end of its stroke, said means comprising the combination with the distributing-valve, of a cross-piece connected therewith for opening and closing it and provided with a pair of flanges, a pair of gravity-movable arms adapted to alternately engage the flanges of the cross-piece for actuating the latter, thereby opening the valve, an oscillatory lever having its upper end provided with a pair of outwardly-extending projections and an intermediate projection, said outwardly-extending projections adapted to alternately elevate and retain said arms in an elevated position and said intermediate projection adapted to actuate the cross-piece in opposite directions in advance of its actuation by said arms, thereby closing the valve and temporarily shutting off the supply of motive fluid until the cross-piece is actuated by the downward movement of one of said arms, and a dash-pot connected with said arms for retarding the downward movement thereof.

12. In valve-gear and other fluid-pressure engines, means for temporarily arresting the movement of the piston at each end of its stroke, said means comprising the combination with the distributing-valve, of a cross-piece connected therewith for opening and closing it and provided with a pair of flanges, a pair of gravity-movable arms adapted to alternately engage the flanges of the cross-piece for actuating the latter, thereby opening the valve, an oscillatory lever having its upper end provided with a pair of outwardly-extending projections and an intermediate projection, said outwardly-extending projections adapted to alternately elevate and retain said arms in an elevated position and said intermediate projection adapted to actuate the cross-piece in opposite directions in advance of its actuation by said arms, thereby closing the valve and temporarily shutting off the supply of motive fluid until the cross-piece is actuated by the downward movement of one of said arms, a dash-pot connected with said arms for retarding the downward movement thereof, and means for regulating the degree of the retardation of each of the dash-pots.

In testimony whereof we have hereunto set our hands, in presence of two subscribing witnesses, this 26th day of April, 1904.

GEOFFREY HOWARD.
GEORGE GIBBS.

Witnesses:
CHARLES JAMES MARSHALL,
ERNEST GEORGE BRANDON.